United States Patent [19]

Barbareschi

[11] 4,072,013

[45] Feb. 7, 1978

[54] FLUID PRESSURE ACTUATED OPERATOR CYLINDER WITH INCORPORATED STRESS CONVERTER

[76] Inventor: Aldo Barbareschi, Via Portofino 15, Turin, Italy

[21] Appl. No.: 618,372

[22] Filed: Oct. 1, 1975

[30] Foreign Application Priority Data

Oct. 10, 1974 Italy .......................................70022/74

[51] Int. Cl.$^2$ ............................................... B60T 13/58

[52] U.S. Cl. ........................................ 60/563; 60/560; 60/565; 60/583; 60/593

[58] Field of Search ................. 60/560, 563, 565, 583, 60/588, 593, 574

[56] References Cited

U.S. PATENT DOCUMENTS

| | | | |
|---|---|---|---|
| 2,976,845 | 3/1961 | Goldring | 60/565 X |
| 3,276,206 | 10/1966 | Calkins | 60/560 |
| 3,395,535 | 8/1968 | Morris | 60/565 X |
| 3,426,530 | 2/1969 | Georgelin | 60/560 |
| 3,511,048 | 5/1970 | Nemetz | 60/565 |
| 3,633,365 | 1/1972 | Belkamp | 60/565 X |

*Primary Examiner*—Martin P. Schwadron
*Assistant Examiner*—Abraham Hershkovitz
*Attorney, Agent, or Firm*—Young & Thompson

[57] ABSTRACT

An operator cylinder comprising, in combination with a hydraulic piston-cylinder unit, an idle transmission piston for supplying to the hydraulic cylinder a pressure of control, and a stress multiplier for supplying when necessary an increased pressure simultaneously excluding the operation of the transmission piston.

6 Claims, 6 Drawing Figures

FLUID PRESSURE ACTUATED OPERATOR CYLINDER WITH INCORPORATED STRESS CONVERTER

BACKGROUND OF THE INVENTION

The present invention relates to a fluid pressure actuated operator cylinder arranged to provide high operational stresses.

As is known, operator cylinders actuated by low pneumatic or hydraulic pressure are preferable, for many applications, to those actuated by high hydraulic pressure, however, the limits of the pressure of the fluid and of the cross-section of the cylinder make them suited for limited stresses only, while the provision of higher stresses requires the use of high hydraulic pressure actuated cylinders. In order to benefit by part of the advantages of both types of operator cylinders, high pressure hydraulic cylinders actuated by air by means of a suitable pneumo-hydraulic conversion station are used in some cases, but obviously such arrangement considerably complicates the installation, and, moreover, not all the advantages peculiar to the pneumatic pressure actuated cylinders are retained. In particular, the installation, between the conversion station and the operator cylinder, or pipes subjected to high pressures is unavoidable, with the dangers, disadvantages and possibilities of failures which are connected therewith.

Moreover, some operator cylinders have been proposed, wherein a conversion station is incorporated in view of avoiding use of external pipes subjected to high pressure. Since, however, direct actuation by low pressure control fluid during some parts of the operation stroke, such as the approach stroke, is extremely advisable, a separation means between the low pressure control fluid and the internal hydraulic fluid of the operator cylinder is needed. Said separation means has been carried out, up to now, in the form of an idle piston accomodated within a cylinder chamber axially aligned beyond the end of the hydraulic cylinder. Such an arrangement has for its consequence, on one hand, a great increase in length of the unit, and on the other hand the need for internal connections which noticeably complicate the structure of the operator cylinder. Particularly, the great length of the unit makes the same unsuitable for most applications thereof.

BRIEF SUMMARY OF THE INVENTION

The object of the present invention is to provide an operator cylinder suitable for any application of such apparatuses, which may be actuated directly by low pressure fluid and nevertheless is capable also of exerting the high stresses which are peculiar to the high hydraulic pressure actuated cylinders and, moreover, has overall dimensions of the same order of magnitude as those of a usual pneumatic cylinder and is completely free from outer pipes subjected to high pressure.

In accordance with this object, the present invention provides an operator cylinder which, besides comprising an operator stem connected to a piston movable within a hydraulic cylinder, comprises also means, located around said hydraulic cylinder, for transmitting a control pressure to the liquid of said hydraulic cylinder, a stress multiplier device arranged to transmit to said liquid a pressure which is higher than the control pressure, and means for cutting off, during the operation of the multiplier device, the communication between the hydraulic cylinder and the means for transmitting the control pressure, in order to prevent the liquid from flowing back towards said means, all said parts being mounted substantially coaxially in a single unit which forms the operator cylinder.

With such an arrangement, which ensures a compact construction with reduced overall dimensions and with a substantially simple structure, mainly due to the transmission means being located around the hydraulic cylinder instead of as a prolongation thereof, the operator stem of the device may be actuated directly at low pressure during the stages of reduced stress, for example during an approach or a moving away stroke, and may be actuated through the incorporated stress multiplier device in order to provide, when required, stresses higher than those allowed by the low pressure actuation system.

The high pressure hydraulic system is entirely incorporated within the device, and therefore no conduits for liquid under very high pressure are required; the dangers, damages and disadvantages which may derive from the use of conduits subjected to high pressure are avoided; the installation is as simple as that of a normal pneumatic cylinder, and all advantages of the latter, including that of the possibility to effect very rapid strokes, are retained, while at the same time no limit is set to the intensity of the stress which may be applied by the operator cylinder during the pressure stroke.

BRIEF DESCRIPTION OF THE DRAWINGS

These and other features of the operator cylinder according to the invention will apear more clearly from the following description of an embodiment given by way of non limitative example only, shown in the accompanying drawings, in which.

DETAILED DESCRIPTION OF THE ILLUSTRATED

Figure 1:
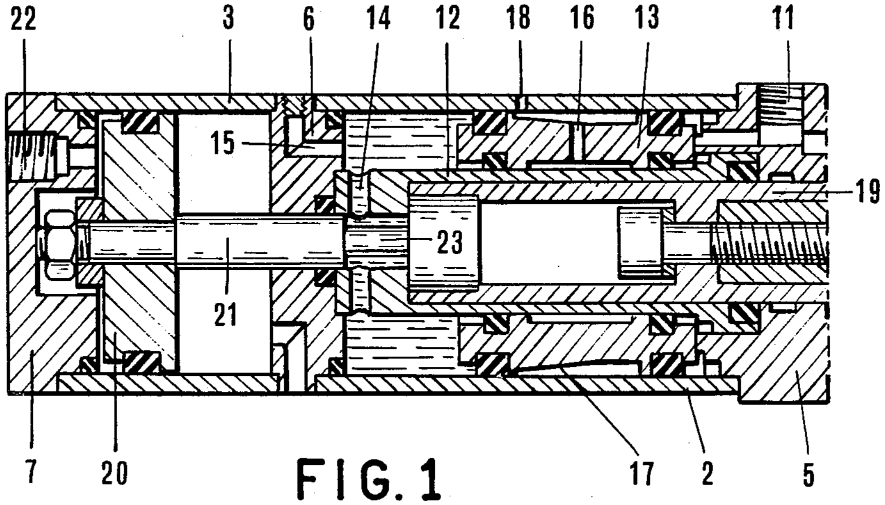
FIGS. 1 and 2, which are to be considered as ideally joined one in continuation of the other with a partial superposition, are sectional views, taken along a diametrical longitudinal plane, of an operator cylinder in accordance with the invention.

The operator device according to the invention will be described hereinafter in its possible embodiment in which the control or actuation pressure is a pneumatic pressure. However, it should be understood that the low pressure actuation system may also be itself a hydraulic system, involving only some minor modifications with respect to the described pneumo-hydraulic system, which modifications will appear obvious to those skilled in the art.

In the following description, the part of the cylinder, from which the operator stem projects, will be considered as being the front part of the device, and the opposite part of the cylinder will be considered as being the rear part.

The operator device shown in the drawings is, in its whole, substantially cylindrical in shape and its casing, which is of the usual type of casings for pneumatic cylinders, has three successive cylinder sections 1, 2 and 3, closed by a front head 4, two intermediate walls 5 and 6 and a rear head 7, respectively. The device may be assembled in a well-known manner by means of tie rods or other means acting between the heads 4 and 7.

The first cylinder section, defined by casing 1, head 4 and wall 5, constitutes substantially a pneumatic cylinder comprising a piston 8, slidable within cylinder 1, connected to a stem 9 which traverses both the head 4 and the wall 5. Formed in the head 4 and in the wall 5 are feeding unions 10 and 11 which serve, respectively, for the retraction and the advancement of the piston 8 with the stem 9. The end of the stem, projecting from the front head 4, may carry any fixture or be connected to any part which has to be actuated by means of the operator cylinder.

Figure 3:
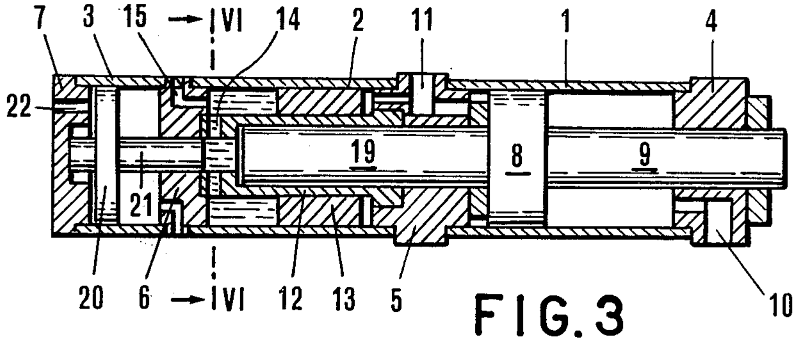
FIGS. 3, 4 and 5 show similarly, but on a smaller scale, the operator cylinder in three characteristic positions.
Figure 4:
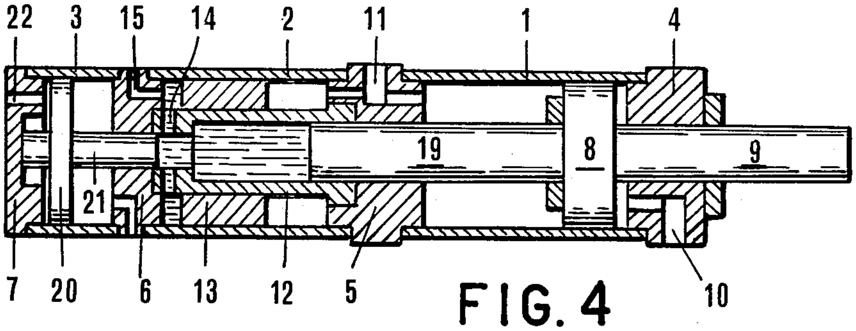
Figure 2:
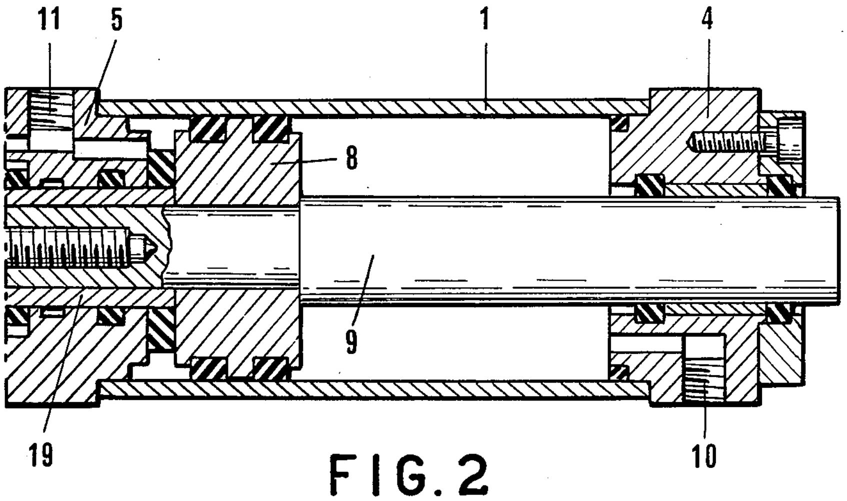

The operation of this part of the device is obvious: when compressed air is fed to the union 11, the operator stem 9 moves from the position shown in FIG. 3 towards the position shown in FIG. 4, and when compressed air is fed to the union 10 the reverse movement takes place. It can readily be seen that when only this section is utilized, the device acts as a usual pneumatic cylinder. Practically, this section will be used for long strokes parts free from high stresses, i.e. for the approach and return strokes, which it will be possible to effect with the rapidity which is peculiar to pneumatic operator cylinders.

Beyond the piston 8, stem 9 is connected to a plunger 19 which slides in a hydraulic cylinder 12 mounted coaxially in the interior of the section 2 of the casing between the intermediate walls 5 and 6. Mounted in the annular space between cylinders 2 and 12 is an annular idle piston 13, and the outer and inner spaces of the hydraulic cylinder 12 communicate with each other through various radial passages 14 formed in the end portion, adjacent to the wall 6, of the cylinder 12. The space defined between idle piston 13, casing 2, wall 6 and, within the cylinder 12, plunger 19, is filled with liquid for hydraulic circuits, introduced through a passage 15, normally closed, formed in the wall 6. The annular space defined between casing 2, wall 5, hydraulic cylinder 12 and idle piston 13, communicates with the feed union 11, and therefore the idle piston 13 transmits to the liquid acting on the plunger 19 the pressure which exists in the pneumatic union 11. Therefore, during the advancement stroke produced by delivering compressed air to the passage 11, the force applied on the stem results from the control fluid pressure applied directly on the piston of the low pressure section, and also from the pressure applied on the piston of the hydraulic section by the means which transmits to the respective liquid the pressure of the control fluid.

During the movements of the assembly formed by piston 8, stem 9 and plunger 19, the idle piston 13 moves always in a direction opposed to said assembly, with no other function than that of separating the liquid of the hydraulic cylinder from the compressed air (or other control fluid).

To this end, the piston 13, as all other parts of the device, is provided with suitable seals, which will not be described in detail because their arrangement is the same as that which is normally used in the art. Furthermore, the idle piston 13 is provided with an inner annular recess connected to a radial passage 16 which opens into a portion 17 of the skirt of the piston 13 which forms an outer recess communicating with the outside of the cylinder through a hole 18 of the casing 2. This arrangement ensures the ouflow of any compressed air tending to flow towards the inner hydraulic circuit which, thus, cannot be reached. Moreover, the bottom surface of the recess 17 is preferably conical in shape, so that by measuring its level by means of a gauge, through the hole 18, while the stem 9 is completely retracted, an indication of the position assumed at rest by the idle piston 13 is obtained, which position depends on eventual leaks of liquid from the inner hydraulic circuit, which leaks can, thus, be detected and, in due time, compensated through the passage 15.

However, this operation may be effected at long and not critical time intervals, because the idle piston 13, by modifying its own final position, spontaneously, within wide limits, compensates the leaks which have taken place.

Other discharge arrangements similar to that indicated by reference numerals 16, 18, may, if necessary, be provided in other parts of the assembly.

Disposed slidably between head 7 and wall 6, in the section 3 of the casing, is a pneumatic piston 20 connected to a plunging stem 21 which traverses the wall 6 and slides, on the side opposed to that where the plunger 19 is situated, in the hydraulic cylinder 12. This plunging stem 21 is disposed so as to sealingly obstruct, when it advances, the passages 14. The unit formed by piston 20 and plunging stem 21 may be controlled by means of compressed air fed to a union 22 formed in the head 7.

Figure 5:
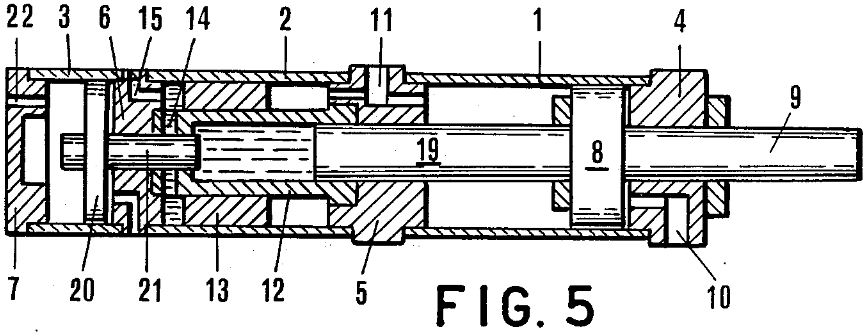
Figure 6:
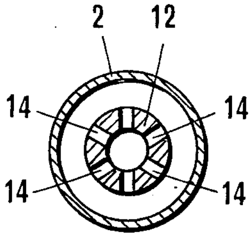
FIG. 6 is a cross-sectional view along line VI—VI of FIG. 3.

If, with the stem 9 in any position, compressed air is fed to the union 22, piston 20 pushes its stem 21, which first advances, thereby repelling the hydraulic liquid towards the idle piston 13, which moves back slightly. But when the stem 21 has completely obstructed the passages 14 (FIG. 5), a further flow of liquid is prevented, and the stem 21 increases the pressure of the liquid in cylinder 12, thereby pushing with high force the plunger 19 and consequently the stem 9 connected to it. The stress thus obtained may be much higher than that obtained penumatically by feeding the passage 11, because it corresponds to the product of the pneumatic pressure, supplied to the union 22, multiplied by the inner section of the casing 3, multiplied by the ratio between the cross-section of the plunger 19 and the cross-section of the plunging stem 21. These quantities may, therefore, be chosen as a function of the desired stress.

Thus, the operation of the operator cylinder according to the invention takes place as follows:

Starting with the stem 9 in its retracted position (Figures from 1 to 3), compressed air is supplied to the union 11. Under the control of the piston 8, the stem 9 effects a rapid advancement stroke with a maximum stress equal to the product of the supplied pneumatic pressure multiplied by the difference between the inner cross-section of cylinder 1 and the annular cross-section of the wall of cylinder 12. The liquid transmission between the idle piston 13 and the plunger 19 does not slow up this movement, nor does it introduce any loss, owing to the large passage cross-section ensured by the radial passages 14.

At the end of the approach stroke, namely, for instance, at the moment a punch carried by the stem 9 is applied against a workpiece, compressed air is supplied to the union 22. The pneumo-hydraulic multiplier system 20-21 applies then to the stem 9, through the plunger 19, a much higher stress, as indicated above, serving, for instance, to effect a punching operation.

By supplying now compressed air to the union 10, after having suspended the feeding to the unions 11 and 12 and after having connected them to a discharge point, piston 8 is pneumatically urged towards the wall 5; said piston retracts the stem 9, while plunger 19, through the liquid of the hydraulic cylinder 12, repels towards the rest position the plunging stem 21 together with the piston 20. Thus, the passages 14 are cleared and the liquid flows back towards the idle piston 13 and pushes it also to the initial position, whereby the whole assembly assumes again its original configuration.

Plunger 19 may carry a projection 23 serving to push positively, at the end of the stroke, the plunging stem 21 together with the piston 20 into the rest position.

The embodiment described hereinabove ensures a very precise guidance of the operator stem and a considerable stress capacity even during the stage of actuation without multiplication of the pressure.

What has been described hereinabove and shown diagrammatically in the annexed drawings is susceptible of being modified in view of particular application requirements and may be completed by accessory equipment, and the various particulars may be substituted by their technical equivalents.

Having thus described my invention, what I claim is:

1. An operator cylinder comprising a casing, said casing comprising three adjacent and successive coaxial sections, two end heads at opposite ends of said casing, two intermediate walls separating said sections, a first pneumatic piston movable in a cylinder comprised by said first section, said first piston having a piston rod comprising an operator stem thereon that extends through and beyond the adjacent said end head, said first piston having a hydraulic plunger thereon that extends into said second section, an annular idle hydropneumatic piston that slides within a cylinder comprised by said second section, said annular piston sealingly surrounding a hydraulic cylinder within said second section, said hydraulic plunger sealingly sliding within said hydraulic cylinder, a second pneumatic piston disposed in a cylinder comprised by said third section, feed passages formed in said heads and in said intermediate walls to supply air under pressure to opposite sides of said first and second pneumatic pistons and to the same side of said annular piston as said first piston and to supply hydraulic fluid under pressure to said second section on the opposite side of said annular piston and to the interior of said hydraulic cylinder, means establishing hydraulic communication between the interior of said hydraulic cylinder and said other side of said annular piston, means actuated by said second pneumatic piston for transmitting to said hydraulic fluid in said hydraulic cylinder a pressure higher than the air pressure to which said first piston is subjected, and cutting off means cooperating with said transmitting means in order to cut-off said communication between said hydraulic cylinder and said annular piston during operation of said transmitting means.

2. An operator cylinder as set forth in claim 1, in which said transmitting means comprises a stem on said second piston that extends in sealed relation through said intermediate wall separating said second and third sections and into said hydraulic cylinder.

3. An operator cylinder as set forth in claim 2, the cross-sectional area of said stem on said second piston being substantially smaller than the cross-sectional area of said hydraulic plunger.

4. An operator cylinder as set forth in claim 2, wherein said cutting off means comprise a number of radial passages formed in said hydraulic cylinder and cooperating with said stem of said second piston in order that said stem, upon termination of a first part of stroke, obstructs said radial passages.

5. An operator cylinder as set forth in claim 1, wherein said annular idle piston has on its outer surface an outer annular recess, the bottom of said recess forming a tapered surface, and said second casing section has a hole, the radius of said tapered surface, in the rest position of the annular piston, being measurable through said hole of the second casing section by means of a gauge.

6. An operator cylinder as set forth in claim 5, wherein an inner annular recess is formed in the inner surface of the annular idle piston and at least one radial passage is provided between said outer and inner annular recesses.

* * * * *